United States Patent [19]
Hadomi

[11] 3,856,947
[45] Dec. 24, 1974

[54] INSECTICIDAL COMPOSITIONS AND METHODS OF KILLING INSECTS USING A MIXTURE OF CYTROLANE AND CHLORPHENAMIDINE

[75] Inventor: Menashe Hadomi, Tel-Aviv, Israel

[73] Assignee: C.T.S. Chemicals & Technical Supplies Ltd., Tel-Aviv, Israel

[22] Filed: Sept. 15, 1971

[21] Appl. No.: 180,881

[30] Foreign Application Priority Data
Sept. 24, 1970 Israel.................................... 35342

[52] U.S. Cl.................................. 424/202, 424/300
[51] Int. Cl........ A01n 9/02, A01n 9/12, A01n 9/22
[58] Field of Search............................ 424/202, 330

[56] References Cited
UNITED STATES PATENTS
3,197,481  7/1965  Addor............................ 260/327 M
3,378,437  4/1968  Arndt et al. ........................ 424/330

Primary Examiner—Albert T. Meyers
Assistant Examiner—Allen J. Robinson
Attorney, Agent, or Firm—Ostrolenk, Faber, Gerb & Soffen

[57] ABSTRACT

A composition for controlling certain lepidepteran larvae, in particular those which harm to cotton, comprising N,N-Dimethyl-N'-(2-methyl-4-chlorophenyl)-formamidine (Chlorphenamidine) and a compound selected among the group comprising 2-(Diethoxyphosphinylimino)-4-methyl-1,3-dithiolane (Cytrolane) and 2-(Diethoxyphosphinothioylimino)-1,3-dithiolane (Cyolane) or a mixture thereof, and a method for controlling insects with said composition.

5 Claims, No Drawings

INSECTICIDAL COMPOSITIONS AND METHODS OF KILLING INSECTS USING A MIXTURE OF CYTROLANE AND CHLORPHENAMIDINE

The present invention relates to a composition for controlling certain lepidepteran larvae, in particular those which harm to cotton, e.g. *Spodoptera littoralis* Boisd also called *Prodenia litura*, and *Earias insulana* also called spiny bollworm.

Prodenia, when in the larval stage, causes great harm to agricultural field crops, in particular to cotton.

So far no compound or composition has been found which satisfactorily controls the above pest. The control is either not sufficiently complete or the lasting effect is not long enough. Moreover, there is not known any compound or composition which is effective enough against both the eggs and the larvae.

N,N-Dimethyl-N'-(2-methyl-4-chlorophenyl)-formamidine (hereinafter called "Chlorphenamidine") is effective against eggs of certain insects, inter alia, of Prodenia. However, it has nearly no effect on the Prodenia larvae. Neither does it sufficiently control the spiny bollworm.

2-(Diethoxyphosphinylamino)-4-methyl-1,3-dithiolane (hereinafter called "Cytrolane") is an insecticide. However, it is not effective at all against the eggs of Prodenia and not sufficiently effective against the larval stages.

2-(Diethoxyphosphinothioylimino)-1,3-dithiolane (hereinafter called "Cyolane") is quite effective in killing the Prodenia larvae but has no effect on the eggs.

The most effective compound against the spiny bollworm is the dimethyl cis-1-methyl-2-methylcarbonylvinyl phosphate (hereinafter called "Nuvacron"). However, Nuvacron has nearly no effect on the other above mentioned larvae which attack cotton plants.

It has now surprisingly been found that if Chlorphenamidine is admixed whith Cyolane and/or Cytrolane a composition is obtained which is very effective in controlling both eggs and the larvae of Prodenia. This effect is long lasting and thus the Prodenia can be controlled by the said composition nearly completely. Moreover, this composition is also effective against the other larvae mentioned above attacking cotton, i.e., the spiny bollworm, a result of which is that one composition can be used to protect the cotton from the attack of said larval pests.

As will be shown hereinafter the mutual influence of Chlorphenamidine and Cytrolane on each other is a synergistic one. The insecticidal activity of Cytrolane against the Prodenia larvae is increased and the ovicidal activity of Chlorphenamidine against the Prodenia eggs is increased as well.

The present invention thus consists in an insecticidal composition comprising Chlorphenamidine and a compound selected among the group comprising Cytrolane and Cyolane or a mixture thereof.

The ratio between Chlorphenamidine and Cytrolane and/or Cyolane may be varied to a great extent. The preferred range is about 1:2 up to about 1:10.

The composition according to the present invention is prepared by admixing the individual ingredients together. Said composition may comprise any further desired compound provided it is compatible with the two essential active compounds of the new composition and has no adverse effect on the activity thereof. Such additional compounds may be, e.g. solvents, emulsifiers, additional insecticides, carriers, etc. The commercial available Chlorphenamidine, Cytrolane and Cyolane mostly comprise such compounds.

The present invention consists also in a method for controlling insects, particularly those larvae which attack e.g. Prodenia and spiny bollworm in an infected area, which comprises applying the above new composition to said area.

The new composition is preferably applied by spraying a solution of the new composition in water onto said area.

The quantity of active compounds to be utilised varies in accordance with the grade of infestation of the area. Preferably approximately 50–200 g of the composition for 1000 $m^2$ dissolved in various amounts of water is employed.

The invention will now be illustrated by the following examples without being limited by them.

EXAMPLE 1

The effectiveness of Cytrolane in comparison with that of a composition according to the present invention was tested against Prodenia larvae in the laboratory. The results are shown in Table I.

Table I

| Cytrolane | Chlorphenamidine | Kill after 24 Hours |
|---|---|---|
| 3 γ | — | 65% |
| 2.4γ | 0.6γ | 98% |

The same test was made against Prodenia eggs. The results are shown in Table II.

Table II

| Cytrolane | Chlorphenamidine | Kill after 24 Hours |
|---|---|---|
| 0.01% | — | 0% |
| 0.01% | 0.001% | 53% |
| — | 0.001% | 15% |
| 0.01% | 0.001% | 45% |

From the above results the mutual synergistic influence of Chlorphenamidine and Cytrolane on each other becomes clearly apparent.

EXAMPLE 2

6 Plots each of 200 $m^3$ of a cotton plantation infected with Prodenia were treated as follows:

a. Plots 1 and 3 were control plots and thus not treated;
b. Plots 2 and 6 were treated with a composition of Chlorphenamidine and Cytrolane (ratio 120 cc:880 cc) diluted in water. (60 cc composition in 4 l of water were sprayed on each plot).
c. Plot 4 was treated with 60 cc of Cyolane in 4 l of water; and
d. Plot 5 was treated with 60 cc of a composition of Chlorphenamidine and Cyolane (ratio 120 cc:880 cc) dissolved in 4 l of water.

The first count was made after 6 days and the results are shown in Table III.

Table III

| Plot | larvae 3-10mm long | larvae 11-25mm long | larvae exceeding 25mm in length |
|---|---|---|---|
| 1 | 46 | 14 | 1 |
| 2 | 0 | 1 | 0 |
| 3 | 18 | 7 | 4 |
| 4 | 3 | 0 | 0 |
| 5 | 0 | 0 | 0 |
| 6 | 3 | 0 | 0 |

The count was made by counting 2 m of length four times in each plot.

Thereafter plot 1 was disregarded.

Plot 7 was added which was treated with 40 ml of a composition of Chlorphenamidine and Cytrolane (ratio 120 cc:880 cc) dissolved in 4 l of water.

Moreover, a further control plot 8 was added.

A further count was made after another week and the results obtained are shown in Table IV.

Table IV

| Plot | larvae 3-10mm long | larvae 11-25mm long | larvae exceeding 25mm in length |
|---|---|---|---|
| 2 | 28 | 1 | 0 |
| 3 | 44 | 8 | 2 |
| 4 | 15 | 0 | 0 |
| 5 | 0 | 0 | 0 |
| 6 | 0 | 0 | 0 |
| 7 | 20 | 0 | 0 |
| 8 | 50 | 5 | 4 |

Said results prove the good effectiveness of the new compositions according to the present invention.

EXAMPLE 3

6 Plots each of 200 m³ of a cotton plantation infested with Prodenia were treated as follows:
a. Plots 2 and 6 were control plots and thus not treated;
b. Plots 1 and 3 were treated with 60 cc of a composition of Chlorphenamidine and Cytrolane (ratio 120cc:880cc) diluted in 4 l of water; and
c. Plots 4 and 5 were treated with 60 cc of Cyolane in 4 l of water.

The first count was made after 11 days and the results obtained are shown in Table V.

Table V

| Plot | Larva 3-10mm | Larva of 11-25mm | Larva exceeding 25 mm |
|---|---|---|---|
| 1 | 0 | 2 | 0 |
| 2 | 53 | 26 | 6 |
| 3 | 0 | 0 | 0 |
| 4 | 0 | 0 | 0 |
| 5 | 17 | 4 | 0 |
| 6 | 13 | 16 | 4 |

The count was performed as in Example 2.

EXAMPLE 4

The results of further experiments are illustrated in the following tables, the compounds utilised in said experiment were commercially available solutions, they were sprayed on the infested areas in that about 1 l of said solution was dissolved in about 7 l of water. The meaning of a.i. is active ingredient and of e.c. is emulsifiable concentrate.

Table VI

Field trial at Nir Galim to compare 009 with Cyolane and Cytrolane in the control of Spodoptera littoralis in cotton (variety 442)

| Product | Rate used at 1st and 2nd dates of spray treatment liter/hectare | | Average number of S. littoralis larvae foci found in 300 meter row segments | | Mean from 3 plots of the averages of S. littoralis larvae in 4 × 4 m. segments of rows | | | | Mean from 3 plots of the averages of S. littoralis larvae in 2 × 4 m. segments of rows | | | |
|---|---|---|---|---|---|---|---|---|---|---|---|---|
| Block I: Spray treatments on 19.7.71 and 28.7.71 | | | | | | | | | | | | |
| | 19.7.71 | 28.7.71 | count: | 15.7.71 | count: 25.7.71 | | | | count: 1.8.71 | | | |
| | l/ha | l/ha | small | medium | total | small | medium | large | total | small | medium | large | total |
| 1. Cyolane | 1.0 | 3.0 | 10.6 | 6.3 | 16.3 | 0.8 | 15.2 | 7.0 | 23.0 | 0.2 | 0 | 0.2 | 0.4 |
| 2. Cytrolane | 1.0 | 2.0 | 12.6 | 9.3 | 21.9 | 10.0 | 10.0 | 5.8 | 25.8 | 0.3 | 0.5 | 1.2 | 2.3 |
| 3. Cytrolane | 1.5 | 3.0 | 8.0 | 9.3 | 17.3 | 1.3 | 3.8 | 5.3 | 10.4 | 0 | 0.2 | 0.2 | 0.4 |
| 4. 009 | 1.0 | 2.0 | 13.3 | 7.0 | 20.3 | 0.3 | 4.8 | 6.3 | 11.4 | 0 | 0.3 | 0.4 | 0.7 |
| 5. 009 | 1.5 | 3.0 | 15.3 | 13.0 | 28.3 | 0 | 4.2 | 5.8 | 10.0 | 0 | 0 | 0.2 | 0.2 |
| 6. untreated control | — | — | 3 | 6 | 9 | 0 | 9.0 | 12.0 | 21.0 | 1.0 | 1.3 | 2.8 | 5.1 |
| Block II: Spray treatment on 27.7.71 only | | | | | | | | | | | | |
| | | 27.7.71 | | | | count: 25.7.71 | | | | count: 2.8.71 | | | |
| | | | | | | small | medium | large | total | small | medium | large | total |
| | | l/ha | | | | | | | | | | | |
| 1. Cyolane | | 3.0 | | | | 2.0 | 15.2 | 13.2 | 30.4 | 0 | 0.8 | 0.1 | 0.9 |
| 2. Cytrolane | | 2.0 | | | | 16.5 | 9.3 | 12.3 | 38.1 | 0 | 4.2 | 8.9 | 13.1 |
| 3. Cytrolane | | 3.0 | | | | 5.3 | 5.8 | 12.2 | 23.3 | 0 | 1.4 | 1.7 | 3.1 |
| 4. 009 | | 2.0 | | | | 6.0 | 7.0 | 18.0 | 31.0 | 0 | 0.2 | 0.3 | 0.5 |
| 5. 009 | | 3.0 | | | | 2.2 | 12.2 | 16.6 | 31.0 | 0 | 0.1 | 0.5 | 0.6 |
| 6. untreated control cotton sown on 24.5.71 | | — | | | | 0 | 1.0 | 10.0 | 11.0 | 2.3 | 2.5 | 0.8 | 5.6 |

Cyolane (American Cyanamid) = 25% a.i. e.c.
Cytrolane (American Cyanamid) = 25% a.i. e.c.
009 = 20% a.i. Cytrolane + 10% a.i. chlorophenamidine

Table VII

Field trial at Nir Galim to compare 009 with Cytrolane and Nuvacron in the control of *Spodoptera littoralis* in cotton (variety 442)

| | Rate used at indicated dates | | Mean from the replicates of the averages of *S. littoralis* larvae in 2 × 4m. segments of rows | | | | No. of replicates | Mean from the replicates of the averages of *S. littoralis* larvae in 2 × 4m. segments of rows | | | | No. of replicates |
|---|---|---|---|---|---|---|---|---|---|---|---|---|
| Block II: spray treatments on 16.8.71 only | | | | | | | | | | | | |
| spray: | 16.8.71 | | count: 29.8.71 | | | | | | | | | |
| | | | small | medium | large | total | | | | | | |
| 3.0 l/ha | 1.2 | | 8.7 | 6.0 | | 15.9 | 3 | | | | | |
| Cytrolane | 3.0 do. | | 7.5 | 39.3 | 14.3 | 51.1 | 3 | | | | | |
| Nuvacron | 2.5 do. | | 2.0 | 36.5 | 37.5 | 76.0 | 1 | | | | | |
| Control (untreated) | — | | 0.5 | 3.5 | 11.0 | 15.0 | 1 | | | | | |
| Block II: spray treatments on 11.8.71 and 16.8.71 | | | | | | | | | | | | |
| spray: | 11.8.71 | 16.8.71 | count: 29.8.71 | | | | | | | | | |
| | | | small | medium | large | total | | | | | | |
| 009 | 3.0 l/ha | 3.0 l/ha | 0.8 | 0.5 | 0.5 | 1.8 | 2 | | | | | |
| Cytrolane | 3.0 do. | 3.0 do. | 1.3 | 4.7 | 0.3 | 6.3 | 3 | | | | | |
| Nuvacron | 2.5 do. | 2.5 do. | 0 | 17.5 | 30.5 | 48.0 | 2 | | | | | |
| Control (untreated) | — | — | 0.5 | 3.5 | 11.0 | 15.0 | 1 | | | | | |
| Block I: spray treatments on 13.8.71 and 23.8.71 | | | | | | | | | | | | |
| spray: | spray: | 13.8.71 | 23.8.71 | count: 27.8.71 | | | | count: 30.8.71 | | | | |
| | | | small | medium | large | total | | small | medium | large | total | |
| 009 | 2.0 or 3.0 | 3.0 l/ha | 0 | 1.0 | 0.2 | 1.2 | 3 | 0 | 0.7 | 0.3 | 1.0 | 3 |
| Cytrolane | 2.0 or 3.0 | 3.0 do. | 0 | 3.2 | 0 | 3.2 | 3 | | | | | |
| Nuvacron | 2.5 l/ha | 2.5 do. | 1.8 | 18.5 | 6.8 | 27.1 | 2 | 3.3 | 27.6 | 31.0 | 61.9 | 3 |
| untreated control | — | — | 0 | 11.0 | 9.5 | 20.5 | 1 | | | | | |

Table VIII

Field trial at Nir Galim to compare 009 with Cytrolane and Nuvacron in the control of *Earias insulana* Boisd. in cotton (variety 442)

| Product | Rate l/ha | No. of replicates | | count: 2 days before treatment | | | | count: 3 days after treatment | | | | Count: 7 days after treatment | | | |
|---|---|---|---|---|---|---|---|---|---|---|---|---|---|---|---|
| | | | | infested bolls with larvae | bolls without larvae | healthy bolls | total No. of bolls counted | infested bolls with larvae | bolls without larvae | healThy bolls | total No. of bolls examined | infested bolls with larvae | bolls without larvae | healthy bolls | total No. of bolls examined |
| 009 | 2.0 | 3 | no. | 25 | 40 | 335 | 400 | 28 | 41 | 140 | 209 | 69 | 96 | 285 | 450 |
| | | | % | 6.2 | 10.0 | 83.8 | | 13.4 | 19.6 | 67.0 | | 15.3 | 21.3 | 63.3 | |
| 009 | 3.0 | 3 | no. | 24 | 38 | 438 | 500 | 22 | 21 | 180 | 223 | 39 | 66 | 339 | 444 |
| | | | % | 4.8 | 7.6 | 87.6 | | 9.9 | 9.4 | 80.7 | | 8.8 | 14.8 | 76.4 | |
| Cytrolane | 2.0 | 3 | no. | 16 | 44 | 340 | 400 | 31 | 43 | 177 | 251 | 87 | 70 | 292 | 449 |
| | | | % | 4.0 | 11.0 | 85.0 | | 12.4 | 17.1 | 70.5 | | 19.4 | 15.6 | 65.0 | |
| Cytrolane | 3.0 | 3 | no. | 32 | 35 | 333 | 400 | 29 | 53 | 143 | 225 | 83 | 74 | 273 | 430 |
| | | | % | 8.0 | 8.7 | 83.3 | | 12.9 | 23.6 | 63.5 | | 19.3 | 17.2 | 63.5 | |
| Nuvacron | 2.5 | 3 | no. | 22 | 53 | 425 | 500 | 28 | 45 | 198 | 271 | 28 | 41 | 381 | 450 |
| | | | % | 4.4 | 10.6 | 85.0 | | 10.3 | 15.7 | 73.0 | | 6.2 | 9.1 | 84.7 | |
| untreated control | — | 1 | no. | 13 | 26 | 161 | 200 | 11 | 10 | 32 | 53 | 47 | 38 | 67 | 152 |
| | | | % | 6.5 | 13.0 | 80.5 | | 20.8 | 18.7 | 60.5 | | 30.9 | 25.0 | 44.1 | |

Cyolane (American Cyanamid) = 25 % a.i. e.c.
Cytrolane (American Cyanamid) = 25 % a.i. e.c.
009 = 20 % a.i. Cytrolane + 10% a.i. chlorphenamidine

Table IX

Field trial at Nir Galim to compare 009 with Cytrolane and Nuvacron in the control of *Earias insulana* Boisd. in cotton (variety 442)

| Product | Rate l/ha | No. of replicates | | count: one day before treatment | | | | count: 3 days after treatment | | | | count: 8 days after treatment | | | |
|---|---|---|---|---|---|---|---|---|---|---|---|---|---|---|---|
| | | | | infested bolls with larvae | bolls without larvae | healthy bolls | total number of bolls counted | infested bolls with larvae | bolls without larvae | healthy bolls | total number of bolls examined | infested bolls with larvae | bolls without larvae | healthy bolls | total number of bolls examined |
| 009 | 3.0 | 3 | No. | 44 | 48 | 232 | 324 | 47 | 44 | 209 | 300 | 19 | 65 | 216 | 300 |
| | | | % | 13.6 | 14.8 | 71/6 | | 15.7 | 14.7 | 69.7 | | 6.3 | 21.7 | 72.0 | |
| Cytrolane | 3.0 | 3 | no. | 48 | 46 | 271 | 368 | 41 | 87 | 192 | 320 | 21 | 67 | 212 | 300 |
| | | | % | 13.0 | 12.5 | 74.5 | | 12.8 | 27.2 | 70.0 | | 7.0 | 22.3 | 70.7 | |
| Nuvacron | 2.5 | 4 | no. | 18 | 18 | 100 | 136 | 13 | 27 | 60 | 100 | 5 | 20 | 75 | 100 |
| | | | % | 13.2 | 13.2 | 73.6 | | 13.0 | 27.0 | 60.0 | | 5.0 | 20.0 | 75.0 | |
| untreated control | — | 1 | no. | 18 | 33 | 72 | 123 | 18 | 9 | 20 | 47 | 12 | 38 | 50 | 100 |
| | | | % | 14.6 | 26.8 | 58.6 | | 38.3 | 19.1 | 42.6 | | 12.0 | 38.0 | 50.0 | |

Cyolane = 25% a.i. e.c.
Cytrolane = 25% a.i. e.c.
009 = 20% a.i. Cytrolane +10% a.i. chlorphenamidine

TABLE X

Field trial at Nir Galim to compare 009 with Cytrolane and Nuvacron in the control of *Earias insulana* Boisd. in cotton (variety 442)

| Product | Rate, l./ha. | Number of replicates | | Count: 2 days before 1st treatment ||| | Count: 4 days after 1st treatment; 1 day before 2d treatment ||| |
|---|---|---|---|---|---|---|---|---|---|---|
| | | | | Infested bolls ||| Total number of bolls examined | Infested bolls ||| Total number of bolls examined |
| | | | | With larvae | Without larvae | Healthy bolls | | With larvae | Without larvae | Healthy bolls | |
| 009 (Block II) | 3.0 | 3 | Number | 27 | 48 | 375 | 450 | 45 | 52 | 237 | 334 |
| | | | Percent | 6.0 | 10.7 | 83.3 | | 13.5 | 15.6 | 71.0 | |
| 009 (Block III) | 3.0 | 2 | Number | No count ||| | 34 | 41 | 204 | 279 |
| | | | Percent | | | | | 12.2 | 14.7 | 73.1 | |
| Cytrolane | 3.0 | 3 | Number | 25 | 60 | 365 | 450 | 50 | 96 | 175 | 321 |
| | | | Percent | 6.0 | 13.3 | 81.1 | | 15.6 | 30.0 | 54.5 | |
| Nuvacron (Block II) | 2.5 | 2 | Number | 22 | 48 | 230 | 300 | 26 | 58 | 195 | 279 |
| | | | Percent | 7.3 | 16.0 | 76.7 | | 9.3 | 20.8 | 69.9 | |
| Nuvacron (Block III) | 2.5 | 2 | Number | No count ||| | 26 | 35 | 226 | 287 |
| | | | Percent | | | | | 9.1 | 12.2 | 78.7 | |
| Untreated control | | 1 | Number | 13 | 20 | 110 | 143 | 18 | 33 | 72 | 123 |
| | | | Percent | 9.1 | 14.0 | 76.9 | | 14.6 | 26.8 | 58.5 | |

| Product | | Count: 3 days after 2d treatment |||  Total number of bolls examined |
|---|---|---|---|---|---|
| | | Infested bolls ||| |
| | | With larvae | Without larvae | Healthy bolls | |
| 009 (Block II) | Number | 49 | 68 | 249 | 366 |
| | Percent | 13.4 | 18.6 | 68.0 | |
| 009 (Block III) | Number | 16 | 30 | 253 | 299 |
| | Percent | 5.4 | 10.0 | 84.6 | |
| Cytrolane | Number | 50 | 86 | 214 | 350 |
| | Percent | 14.3 | 24.6 | 61.1 | |
| Nuvacron (Block II) | Number | 12 | 42 | 196 | 250 |
| | Percent | 4.8 | 16.8 | 78.4 | |
| Nuvacron (Block III) | Number | 11 | 28 | 263 | 302 |
| | Percent | 3.6 | 9.2 | 87.1 | |
| Untreated control | Number | 18 | 9 | 20 | 47 |
| | Percent | 38.3 | 19.1 | 42.6 | |

TABLE X—Continued

| Product | Rate, l./ha. | Number of replicates | | Count: 8 days after 2d treatment |||| Count: 13 days after 2d treatment |||| |
|---|---|---|---|---|---|---|---|---|---|---|---|---|
| | | | | Infested bolls || Healthy bolls | Total number of bolls examined | Infested bolls || Healthy bolls | Total number of bolls counted |
| | | | | With larvae | Without larvae | | | With larvae | Without larvae | | |
| 009 (Block II) | 3.0 | 3 | Number | 15 | 48 | 237 | 300 | 29 | 42 | 227 | 298 |
| | | | Percent | 5.0 | 16.0 | 79.0 | | 9.7 | 14.1 | 76.2 | |
| 009 (Block III) | 3.0 | 2 | Number | 35 | 162 | | 200 | No count ||| |
| | | | Percent | 4.5 | 17.5 | 81.0 | | | | | |
| Cytrolane | 3.0 | 3 | Number | 20 | 61 | 219 | 300 | 34 | 37 | 228 | 299 |
| | | | Percent | 6.7 | 30.3 | 73.0 | | 11.4 | 12.4 | 76.3 | |
| Nuvacron (Block II) | 2.5 | 2 | Number | 2 | 27 | 171 | 200 | 11 | 20 | 169 | 200 |
| | | | Percent | 1.0 | 13.5 | 85.5 | | 5.5 | 10.0 | 84.5 | |
| Nuvacron (Block III) | 2.5 | 1 | Number | 11 | 28 | 161 | 200 | No count ||| |
| | | | Percent | 5.5 | 14.0 | 80.5 | | | | | |
| Untreated control | | 1 | Number | 12 | 38 | 50 | 100 | 5 | 29 | 66 | 100 |
| | | | Percent | 6.0 | 19.0 | 25.0 | | 5.0 | 29.0 | 66.0 | |

Cyclane (American Cyanamid) = 25% a.i., e.c.
Cytrolane (American Cyanamid) = 25% a.i., e.c.
009 (C.T.S.) = 20% a.i. Cytrolane plus 10% a.i. chlorphenamidine.

TABLE XI

Field trial at Nir Galim to compare 009 with Cytrolane and Nuvacron in the control of *Earias insulane* in cotton (variety 442)

Count: 7 days after 1st treatment

| Product | Date of treatment | Rate, l./ha. | Number of replicates | | Infested bolls – With larvae | Infested bolls – Without larvae | Healthy bolls | Total number of bolls examined |
|---|---|---|---|---|---|---|---|---|
| 009 | 13.8.71 | 2.0 | 3 | Number<br>Percent | 69<br>15.3 | 96<br>21.3 | 285<br>63.3 | 450 |
|  |  | 3.0 | 3 | Number<br>Percent | 39<br>8.0 | 66<br>14.8 | 339<br>76.4 | 444 |
| Cytrolane | 13.8.71 | 2.0 | 3 | Number<br>Percent | 87<br>19.4 | 70<br>15.6 | 392<br>65.0 | 449 |
|  |  | 3.0 | 3 | Number<br>Percent | 83<br>19.3 | 74<br>17.2 | 273<br>63.5 | 430 |
| Nuvacron | 13.8.71 | 2.5 | 3 | Number<br>Percent | 28<br>6.2 | 41<br>9.1 | 381<br>84.7 | 450 |
| Untreated control |  |  | 1 | Number<br>Percent | 47<br>30.9 | 38<br>25.0 | 67<br>44.1 | 152 |

Count: 3 days after 2d treatment; 14 days after 1st treatment

| Date of treatment | Rate, l./ha. | Number of replicates | Infested bolls – With larvae | Infested bolls – With larvae % | Without bolls | Without bolls % | Total number of bolls examined |
|---|---|---|---|---|---|---|---|
| 23.8.71 | 3.0 | 3 | 16 | 5.3 | 37 | 12.2 | 303 |
|  |  |  |  |  | 250 | 82.5 |  |
| 23.8.71 | 3.0 | 3 | 5 | 1.7 | 47 | 15.7 | 300 |
|  |  |  |  |  | 248 | 82.7 |  |
| 23.8.71 | 2.5 | 3 | 4 | 1.3 | 34 | 11.3 | 300 |
|  |  |  |  |  | 262 | 87.3 |  |
|  |  | 1 | 5 | 5.0 | 29 | 29.0 | 100 |
|  |  |  |  |  | 66 | 66.0 |  |

TABLE XI—Continued

Count: 6 days after 2d treatment; 17 days after 1st treatment

| Product | Date of treatment | Rate, l/ha | Number of replicates | Infested bolls – With larvae | Infested bolls – Without larvae | Healthy bolls | Total number of bolls examined |
|---|---|---|---|---|---|---|---|
| 009 | 3.8.71 | 3.0 | 3 | 4<br>1.3 | 48<br>16.0 | 248<br>82.7 | 300 |
|  |  | 3.0 | 3 | 3<br>1.0 | 27<br>9.0 | 270<br>224 | 300 |
| Cytrolane | 3.8.71 | 3.0 | 3 | 19<br>6.3 | 57<br>19.0 | 9.0<br>74.7 | 300 |
|  |  | 3.0 | 3 | 12<br>4.0 | 42<br>14.0 | 246<br>82.0 | 300 |
| Nuvacron | 3.8.71 | 2.5 | 3 | 2<br>0.7 | 34<br>11.3 | 264<br>88.0 | 300 |
| Untreated control |  |  | 1 | 6<br>6.0 | 38<br>38.0 | 56<br>56.0 | 100 |

Cytrolane (American Cyanamid)—25% a.i., e.c.
Chlorphenamidine=N,N-dimethyl-N'-(2-methyl-4-chlorophenyl)-formamidine.
009=20% a.i. Cytrolane plus 10% a.i. chlorphenamidine.
Nuvacron (Ciba-Geigy)=40% a.i., e.c.=monocrotophos.

I claim:

1. A synergistic insecticidal composition comprising N,N-dimethyl-N'-(2-methyl-4-chlorophenyl)-formamidine and 2-(diethoxyphosphinylimino)-4-methyl-1,3-dithiolane in a ratio of 1:2 to 1:10, respectively.

2. The synergistic insecticidal composition of claim 1 wherein the ratio is 1:2.

3. A method for controlling insect larvae harmful to cotton which comprises applying an effective insecticidal amount of the composition of claim 1 to an infected area.

4. The method of claim 3 wherein said composition is applied as a solution in water.

5. The method of claim 3 wherein 50 to 200 grams of said composition in 17 to 25 liters of water is used per 1,000 cubic meters of infected area.

* * * * *